Jan. 14, 1930.  I. H. ATHEY  1,743,589
VEHICLE
Filed May 12, 1923   3 Sheets-Sheet 1
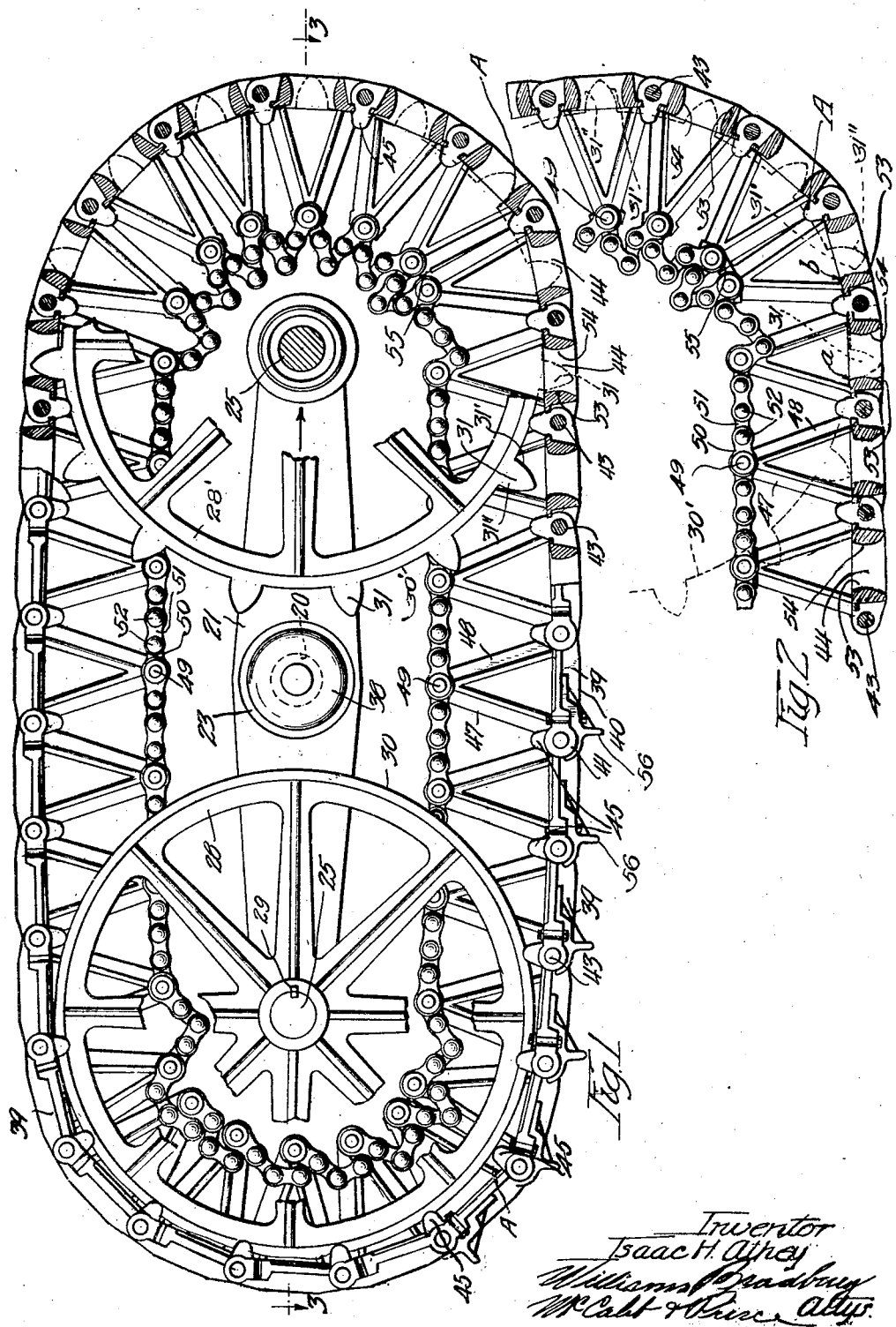

Jan. 14, 1930.  I. H. ATHEY  1,743,589
VEHICLE
Filed May 12, 1923   3 Sheets-Sheet 2
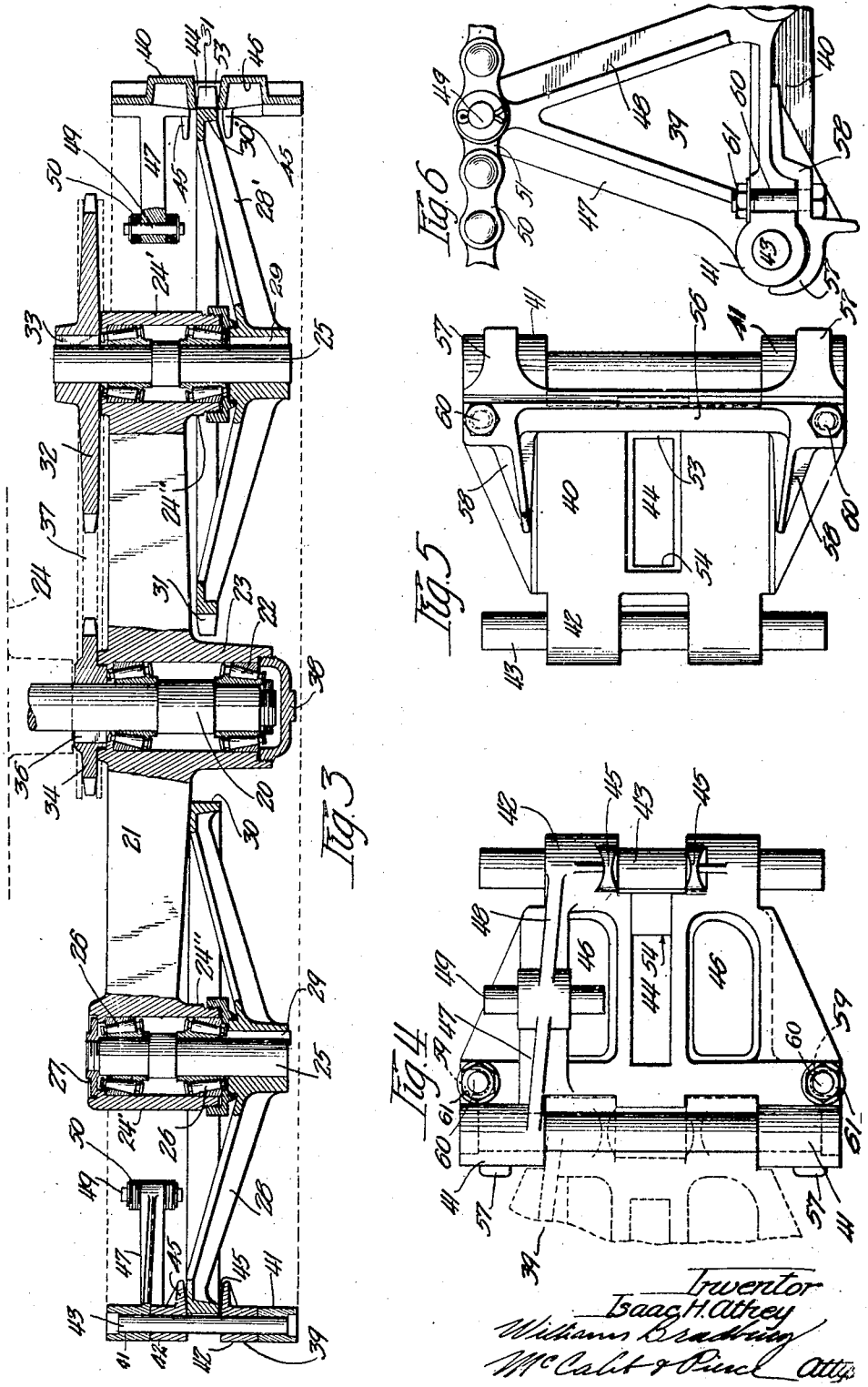

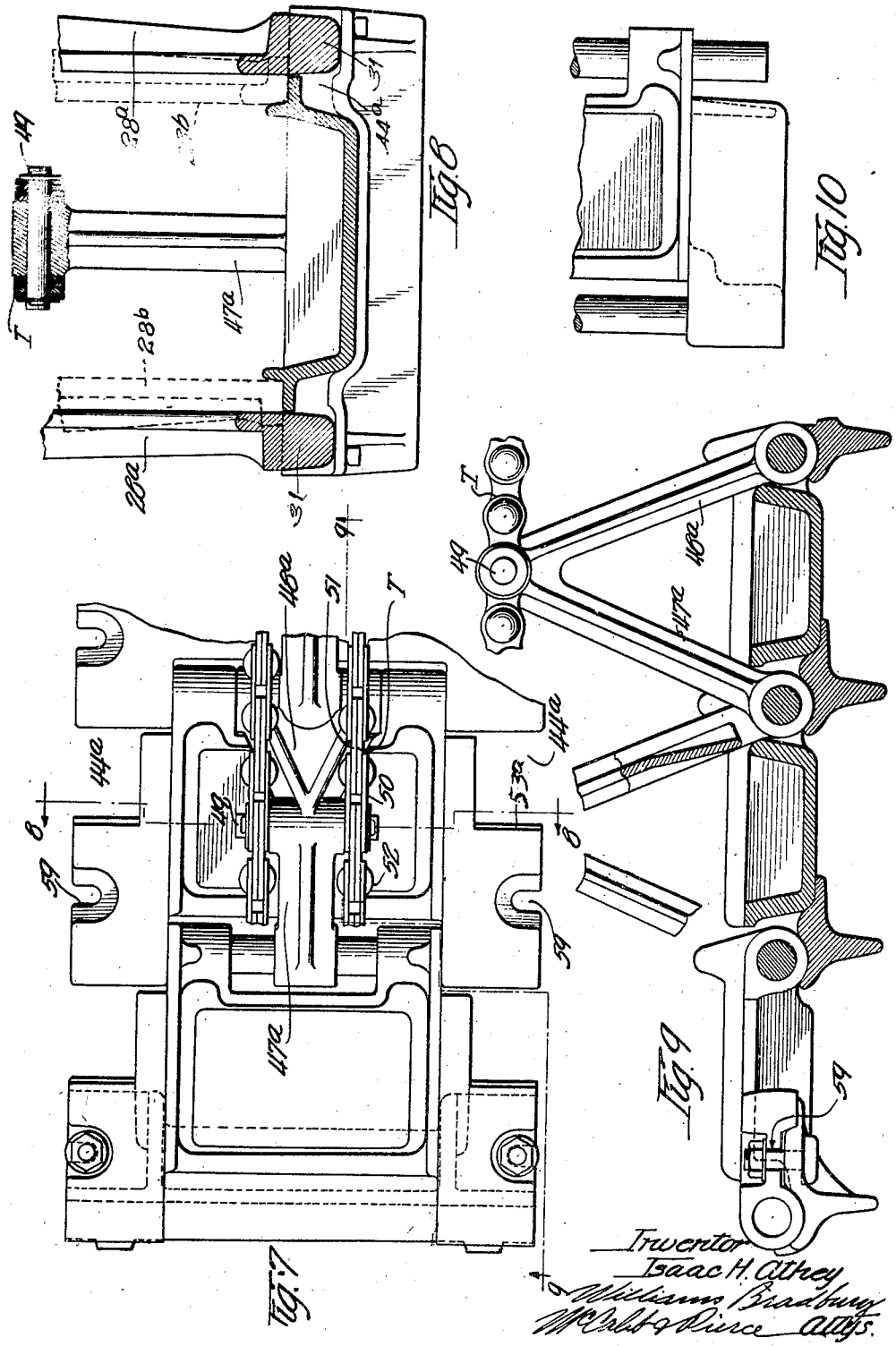

Patented Jan. 14, 1930

1,743,589

UNITED STATES PATENT OFFICE

ISAAC H. ATHEY, OF CHICAGO, ILLINOIS, ASSIGNOR TO ATHEY TRUSS WHEEL CO., OF CHICAGO, ILLINOIS, A CORPORATION OF ILLINOIS

VEHICLE

Application filed May 12, 1923. Serial No. 638,493.

My invention relates to improvements in vehicles, and is particularly concerned with improvements in that type of vehicle comprising a plurality of load supporting wheels rolling upon a flexible track which is formed of a plurality of links pivotally connected or hinged together at their edges.

Generally speaking, one of the objects of my invention is to provide a vehicle of the character described which is simple in construction and of lighter weight than vehicles of this type heretofore constructed, but which is at the same time strong and durable.

Another object of my invention is to provide a vehicle such as described, which is particularly adaptable to be used as a tractor. In carrying out this part of my invention I provide a sprocket wheel, which is preferably one of the load supporting wheels, having teeth for engaging the flexible track chain for the purpose of driving the vehicle, the relative arrangement of the teeth on the sprocket wheel and the contacting surfaces on the flexible track being such that the teeth of the sprocket wheel move into and out of engagement with these contacting surfaces without sliding or grinding contact therewith, thereby eliminating the excessive wear which has heretofore taken place between the teeth of the sprocket wheel and the flexible track.

Other objects of my invention are to provide a vehicle or vehicles comprising a load supporting axle, a beam rotatably mounted upon said axle and carrying load supporting wheels at the ends thereof, in combination with a flexible track for supporting said wheels, the construction of said beam, track and wheels being such as to provide a maximum degree of strength with minimum weight.

Another object of my invention is to provide a novel type of link for constructing a flexible track such as referred to above, and a still further object of my invention is to provide a novel grouser.

The above and other objects of my invention will more readily appear as this description progresses, reference being had to the accompanying drawings, wherein Figure 1 is a side elevation of a vehicle embodying my invention, certain portions thereof being broken away for the purpose of better illustration;

Figure 2 is an enlarged sectional detail showing some of the parts of Figure 1 in the positions they occupy just before they move to the positions shown in Figure 1;

Figure 3 is a longitudinal, horizontal section taken on line 3—3 of Figure 1;

Figure 4 is an inner plan of one of the links forming the flexible track which I prefer to use as a part of the construction shown in Figures 1, 2 and 3;

Figure 5 is an outer plan view of the link shown in Figure 4;

Figure 6 is a side elevation, partially broken away, of the same link;

Figure 7 is an inner plan of a small section of a modified form of flexible track;

Figure 8 is a vertical, transverse section taken on line 8—8 of Figure 7;

Figure 9 is a vertical, longitudinal section taken on line 9—9 of Figure 7; and

Figure 10 is a fragmentary plan of another modified form of track link.

Throughout the several figures, similar reference characters are used for referring to similar parts, and the several sections are taken looking in the direction of the small arrows.

Referring to the drawings, and for the present to Figures 1 to 6 inclusive, I have illustrated my invention as being embodied in a vehicle comprising a load supporting live axle 20, upon one end of which the load supporting beam 21 is rotatably mounted. Preferably, anti-friction devices 22 are inserted between the end of the axle 20 and the bearing sleeve or hub 23 of the load supporting beam. It will, of course, be understood that a similar load supporting beam 21 is mounted upon the opposite end of the axle 20 and carries parts like those about to be described. The load supporting platform 24 shown in dotted outline in Figure 3 may be mounted upon the axle 20 in a suitable or desirable manner. Each end of the beam 21 carries a bearing 24', one end 24" of which projects outwardly beyond the adjacent side of the beam.

A shaft 25 is journaled in each of the bearings 24'. I prefer to mount these shafts upon suitable antifriction devices 26, and one end of the bearing is preferably closed by means of a cap 27 which may be secured to the adjacent end of the shaft 25, as shown in Figure 3, or supported in any other manner. Load supporting wheels 28 and 28' are secured to the projecting ends of the respective shafts 25 by means of keys 29, and I prefer to make these wheels concave in form so as to cause the rims 30, 30' thereof to overhang the outwardly projecting ends of the bearings 24', and thereby relieve the shafts 25 of bending stresses which would otherwise be imposed thereupon.

If the vehicle which I have just described is to be a tractor, I provide one of the wheels wheel 28' of the drawings with a plurality of sprocket teeth 31 and secure to the opposite end of the shaft 25, upon which this wheel is mounted, a sprocket gear 32 by means of a key 33. A sprocket pinion 34 is secured to the axle 20 by means of the key 36 and this sprocket pinion is connected with the sprocket gear 32 by means of a suitable driving chain 37. The axle 20 can be driven in a well-known manner by a motor carried by the vehicle. I prefer to close the outer end of the hub or bearing 23 of the beam 21 by means of a suitable cap 38, to exclude dust, dirt, water, etc.

The flexible track upon which the load supporting wheels 28 roll is formed of a plurality of links or shoes 39, each of which comprises a substantially flat tread member or portion 40, one end of which is provided with a pair of spaced, transversely extending bearing lugs 41, which are preferably substantially cylindrical in contour, and the other end of which is provided with a pair of spaced bearing lugs 42 which are, however, closer together than the bearing lugs 41, so that they will fit in between the bearing lugs 41 of an adjacent link in order that they may be pivotally connected or hinged together by means of the pintles 43. Each shoe has formed therein a centrally located, longitudinally extending slot 44 which forms a socket for receiving the sprocket teeth 31. To insure proper meshing of the sprocket teeth with the slots 44, I prefer to provide the guide lugs 45 which extend upwardly from the bearing lugs 42 and are bevelled outwardly as shown in Figure 4. For the purpose of making the links 39 as light as possible, I provide the tread portions thereof with a pair of comparatively large depressions 46 located upon opposite sides of the slot 44.

I prefer to make the flexible track of my improved vehicle of the trussed type, and for this purpose I provide each of the links with a pair of truss arms 47 and 48, which respectively project inwardly from a bearing lug 41 and a bearing lug 42 located upon the same side of a slot 44. These truss arms converge and carry at their inner ends a pivot pin 49, the ends of which project outwardly beyond the truss arms for the purpose of receiving the ends of the truss links 50 forming part of a collapsible truss chain for trussing the inner ends of the truss arms. The links 50 alternate with links 51, and are pivotally connected therewith by means of pivot pins 52. As many links may be used between the truss arms of adjacent links as may be desirable. From the above description, it will be noted that the arrangement of the bearings on the beams and of the wheel rims and the flexible track is such that the load will be imposed upon these members with substantially no twisting or bending stresses, and that the truss chain and truss arms lie in the planes of the load supporting beams, thereby making a strong and compact arrangement.

One of the objectionable features heretofore experienced in connection with tractors embodying flexible tracks and load carrying wheels rolling thereupon, one or more of the load carrying wheels comprising sprocket teeth for engaging the links of the flexible track, has been the rapid wearing away of the sprocket teeth and the portions of the track with which the sprocket teeth engage. This wearing away has been caused by the sliding contact between the sprocket teeth and the co-acting portions of the flexible track. Such sliding contact in the presence of dirt, sand, etc., causes the contacting portions to wear very rapidly. I have already stated that one of the objects of my invention is to prevent this rapid wear, and I accomplish this by providing a construction in which the teeth move into and out of contact with the co-operating portions of the flexible track without any appreciable sliding contact. To accomplish this, I have made the ends 53 and 54 of the slots or sockets 44 curved, as shown in Figure 1, in which the vehicle will be considered as travelling in the direction of the arrow appearing at the beam 21. For the purpose of convenience, I shall refer to end 54 of the slot as the leading end, and end 53 of the slot as a trailing end. For the same reason, I shall refer to the edges 31' of the sprocket teeth as the leading edges and the edges 31'' as the trailing edges. While the curvature of the ends 53 and 54 of the slots 44 is not fixed, I prefer to place the centers of these curves on the axes of the adjacent pintles 43.

In order to produce the mode of operation which I desire to produce, it is necessary to make the pitch of the links of the flexible track, that is, the distance between axes of adjacent pintles 43, greater than the pitch of the sprocket teeth 31. This will permit a certain amount of slack to accumulate adjacent the points A, which will permit the links to move substantially to their load supporting positions before the forward load supporting wheel rolls upon the links and permit them to maintain this position until the rear load supporting wheel rolls off the links. The slots 44 are larger than the width of the teeth 31, leaving a certain amount of travel for a given tooth in its associated slot in the half revolution during which the tooth is in the slot. The difference in pitch between the links and the sprocket teeth is substantially equal to this travel of the tooth in a slot divided by half the number of sprocket teeth on each drive wheel.

In Figure 2 the drive wheel is so located with respect to the flexible track that the trailing edges of two of the sprocket teeth 31 have just made contact with the trailing ends 53 of the slots of the links with which they are co-acting. In this position the link which is about to assume its load supporting position forms the greatest angle with the link upon which the wheel is resting at that instant, and this position of the two links determines not only the pitch of the sprocket teeth 31, but also the curvature of the edges of these teeth. The distance from the point a on the trailing end 53 of the slot to the point b on the trailing edge 53 of the link which is about to assume the load supporting position, is equal to and determines the pitch of the teeth 31 and the radius of the curvature of the edges of the teeth 31.

The truss arms 47 and 48 of the links of the flexible track should be so designed and proportioned that adjacent truss arms of the two links which lie immediately in advance of the link upon which the sprocket wheel is rolling, contact with each other at some point, such as the point 55, to form in effect one rigid double link which will always tend to pull downwardly upon the stretch of chain lying immediately above it, so as to take full advantage of the difference between the pitch of the links and the pitch of the sprocket teeth, and thereby cause the slack to accumulate adjacent the point A of the sprocket wheel.

As the drive wheel rolls from the position shown in Figure 2 to the position shown in Figure 1, the link upon which the drive wheel is about to roll will begin to straighten out to its load supporting position, and in doing this, the point b will move away from the point a, and since one of the sprocket teeth 31 is in contact with the end 53 of the slot in the link with which this tooth is co-acting, it necessarily follows that this tooth 31 will also move away from the point a of the succeeding link and carry with it the sprocket tooth 31 which is in contact with the trailing end 53 upon which the point a is located. In this manner, a separation is produced between the sprocket teeth and the trailing ends of the slots, so that as the sprocket teeth are lifted out of the slots in the links by the continued movement of the drive wheels, there is no sliding contact or at most but a minimum sliding contact between the trailing edges of the sprocket teeth and the trailing ends of the slots. It will also be noted from inspection of Figures 1 and 2 that the sprocket teeth move into engagement with the trailing ends of the slots without sliding contact. By the construction just described, I am able, as pointed out above, to very greatly decrease the wear upon the edges of the sprocket teeth and the contacting surfaces of the links of the track.

For travelling over streets and highways, it is desirable to have the outer faces of the tread portions of the links forming the track chain to present smooth, unbroken surfaces, so as not to destroy the surfaces of the highways. However, when vehicles of this type are travelling on soft or sandy soils, it is customary to employ detachable cleats or grousers which are secured to the links to increase the traction of the vehicle, and for this purpose I provide grousers (indicated in Fig. 1 and shown in detail in Figs. 4, 5, and 6) which are in the form of an elongated bar 56, having lateral projections 57 at each end thereof adapted to embrace the cylindrical portions of the hinge lugs 41, and oppositely extending lateral projections 58 contacting with the tread portion of each link. For securing the grousers to the links, I provide notches 59 which extend inwardly on opposite sides of the tread portion of each link for receiving bolts 60 which pass through suitable openings in the ends of the bar 56. These bolts are provided with suitable nuts 61 for securing the parts in place. This construction enables the grousers to be easily and quickly secured to or removed from the track, and it is practically impossible for them to work loose and become lost without the removal of one or the other of the bolts securing each of them in place.

The construction shown in Figures 7, 8, and 9 is similar to that described above, except that here there are two spaced sprocket wheels 28$^a$ at one end of the beam which ride adjacent the respective extreme edges of the track chain and two spaced trailing wheels 28$^b$ at the other end of the beam, the latter trailing wheels 28$^b$ having no sprocket teeth and being spaced a lesser distance apart than the sprocket wheels 28$^a$ so that the trailing wheels ride upon portions of the track spaced inwardly from the respective edges rather than along the lateral margins of the track as do the sprocket wheels. As shown in Fig. 7, this causes the trailing wheels 28$^b$ to run upon a continuous track shelf, with the result that the trailing wheels are not given an up and down movement as would be the case if the trailing wheels ran over the notches 44$^a$.

In this form the truss arms 47$^a$ and 48$^a$ must be placed substantially centrally of the links as shown in Figure 7, but in its modified form of my invention I make use of the same type of truss chain T as described above as being comprised of the truss links 50 and 51 and pivot pins 49 and 52. In this form of my invention, the slots for receiving the sprocket teeth of the drive wheel take the form of notches 44ª formed in the sides of the links, the ends 53ª being curved in the same manner as the trailing ends of the slots 44. The sprocket teeth and the slots or sockets in the track shoes may be related to each other as previously explained in connection with Figs. 1 to 6, in order to reduce wear. Notches 59 for receiving the bolts which hold the grousers upon the links may also be provided in this form of my invention, but these notches are so located that the bar portion of the grouser practically conceals or covers the joint between adjacent links, as shown in Figure 9, thereby preventing to a considerable degree the access of dirt, sand and gravel to the joints between adjacent links.

Figure 10 shows a still further modification of the construction shown in Figures 7, 8 and 9, in which the notches 44ª of Fig. 7 are eliminated by extending the sides of the links to fill these spaces, thereby providing a construction which is particularly adapted to form part of a vehicle which is to be used as a trailer and not as a tractor. By thus extending the sides, a smooth track portion is formed for the load supporting wheels to roll upon.

While I have described the details of construction of the preferred embodiments of my invention, it is to be clearly understood that my invention is not limited to these details, but is capable of other adaptations and modifications within the scope of the appended claims.

Having thus described my invention, what I claim is:

1. A vehicle comprising an axle, a beam rotatably mounted upon said axle, a bearing carried by each end of said beam, one end of each of said bearings projecting laterally from said beam, a load supporting wheel carried by each of said bearings, said load supporting wheels being concaved so that the rims thereof project over the outwardly extending ends of said bearings, and a track chain for said load supporting wheels formed of a plurality of links, each comprising a tread portion and an inwardly extending truss arm, the adjacent edges of the tread portions of said links being pivotally connected to form a flexible track, said truss arms lying within the vertical plane of said beam, and collapsible means for connecting the inner ends of said truss arms.

2. The combination with a link forming part of a flexible track for a vehicle, said link comprising a tread portion having transversely aligned bearing lugs at one end thereof, said bearing lugs being substantially cylindrical, and said tread portion having aligned slots extending inwardly from each end thereof adjacent said bearing lugs, of a grouser for said link comprising a bar extending transversely thereof and having laterally extending curved projections at each end for embracing said bearing lugs, said bar having a projection at each end extending laterally in a direction opposite to said curved projections and contacting with the outer face of said tread portion, and bolts passing through the ends of said bars and said inwardly extending slots for securing said grouser to said link.

3. The combination with a link forming part of a flexible track for a vehicle, said link comprising a tread portion having aligned slots extending inwardly from each end thereof, of a grouser for said link comprising a bar extending transversely thereof, said bar having a projection at each end extending laterally and contacting with the outer face of said tread portion, and bolts passing through the ends of said bars and said inwardly extending slots for securing said grouser to said link.

4. The combination with a link forming part of a flexible track for a vehicle, said link comprising a tread portion having transversely aligned bearing lugs at one end thereof, said bearing lugs being substantially cylindrical, and said tread portion having aligned slots extending inwardly from each end thereof adjacent said bearing lugs, a grouser for said link comprising a bar extending transversely thereof and having laterally extending curved projections at each end for embracing said bearing lugs, and bolts passing through the ends of said bars and said inwardly extending slots for securing said grouser to said link.

5. A link for a flexible track chain for vehicles, comprising a tread portion having a longitudinally extending slot substantially centrally disposed, pintle bearings at each end of said tread portions, guide lugs formed integrally with the pintle lugs at one end of said tread portion and extending inwardly for the purpose of guiding a load supporting wheel over said slot, and a truss arm extending at an angle to said tread portion at one side of said slot, the bottom portion of said truss arm being formed integrally with the pintle bearings at the opposite ends of said tread portion.

In witness whereof, I hereunto subscribe my name this 7th day of May, 1923.

ISAAC H. ATHEY.